United States Patent [19]
Agnew

[11] 3,981,963
[45] Sept. 21, 1976

[54] IRON CHLORIDE ACTIVATED OXIDATION OF SULFIDE ORES

[76] Inventor: Kenneth Leslie Agnew, 100 Tilley Road, Sault Ste. Marie, Canada, P6B 3Y9

[22] Filed: Jan. 22, 1975

[21] Appl. No.: 542,917

[52] U.S. Cl. .................................. 423/39; 423/46; 423/109; 423/150; 423/568
[51] Int. Cl.² .................... C01G 3/04; C01G 9/04; C01G 51/08; C01G 53/08
[58] Field of Search .................. 75/101 R, 110, 111, 75/113, 115, 117, 119, 7; 423/27, 46, 109, 150, 38, 39, 45

[56] References Cited
UNITED STATES PATENTS

| | | | |
|---|---|---|---|
| 1,571,502 | 2/1926 | Venn-Brown | 75/113 |
| 1,719,534 | 7/1929 | Coolbaugh et al. | 423/45 |
| 1,822,995 | 9/1931 | Meyer | 75/113 |
| 1,943,335 | 1/1934 | Mitchell | 75/110 |

FOREIGN PATENTS OR APPLICATIONS

| | | | |
|---|---|---|---|
| 338,556 | 1/1932 | United Kingdom | 75/115 |

*Primary Examiner*—Oscar R. Vertiz
*Assistant Examiner*—Brian E. Hearn

[57] ABSTRACT

A method is disclosed for oxidation of finely-divided sulphide ores or mattes containing iron, with one or more of the elements nickel, copper, cobalt, zinc and lead as constituents, in the presence of iron chloride in an oxygen-containing atmosphere at a temperature of 220°–400° C, to convert the mixture of iron chlorides and sulphides to water-insoluble iron oxide, the nickel, copper, cobalt and zinc being converted to water-soluble chlorides and sulphates, and the lead to a sulphate which may be leached away from the residual iron oxide by special solvents for lead sulphate. The initial iron chloride is preferably obtained by adding aqueous hydrochloric acid to the concentrate, if iron sulphide is present in a susceptible form, to drive off a portion of the sulphide sulphur as hydrogen sulphide gas, and to convert the corresponding iron sulphide to iron chloride. Temperatures may rise as high as 450° C during the roasting phase if special conditions are observed while cooling.

11 Claims, 1 Drawing Figure

IRON CHLORIDE ACTIVATED OXIDATION OF SULFIDE ORES

BACKGROUND OF THE INVENTION

1. Field of the Invention

The invention relates to the removal of non-ferrous metals, as solutions, from sulphide ores, leaving iron oxide as a residue. The sulphur is driven off at a relatively low temperature, and in a concentrated form. In the preferred embodiment, where sufficient iron sulphide is present in a suitable form, two thirds of the sulphur would be driven off by hydrochloric acid as hydrogen sulphide, and could be combined with the one third driven off principally as sulphur dioxide during the roasting step, in a Claus reaction, to produce non-polluting elemental sulphur:

$$2 H_2S + SO_2 = 2 H_2O + 3 S°$$

2. Description of the Prior Art

A large number of chlorination and chlorination-roasting processes have been devised for treating ores and concentrates. U.S. Pat. No. 3,117,860 (Jan. 14, 1964) describes "Methods of Removing Copper and Related Metals from Sulphidic Molybdenum Ores and Molybdenum-Containing Materials" by means of injection of chlorine gas below 400° C; some oxygen may be tolerated, but the method of the process sulubilizes iron as well as copper. U.S. Pat. No. 3,416,914 (Dec. 17, 1968) describes a "Chloride Process for Producing Iron from Iron Ore" where an oxide ore is chlorinated, volatilized and reduced to iron. U.S. Pat. No. 3,432,255 (March, 1969) describes a "Hydrochlorination Process for Recovery of Metal Values" where the desired metals (e.g. molybdenum) are volatilized as chlorides at a temperature above 500° C. U.S. Pat. No. 3,466,167 (Sept. 9, 1969 describes the "Removal of Impurities from Nickel Sulphide" by heating the sulphide between 400° F and 700° F, while chlorine gas is passing, to render iron and other impurities soluble, while leaving the nickel sulphide unaffected. U.S. Pat. No. 3,537,961 (Nov. 3, 1970) describes a "Process of Treating Copper Ores" with chlorine gas at 350°–600° C and leaching the chlorinated copper away from the unreacted iron sulphide. U.S. Pat. No. 3,674,462 (July 4, 1972) describes a "Process for Low Temperature Chlorination of Roasted Products from an Iron Sulphide Roasting Process Prior to Leaching out the Non-Ferrous Metal present therein", in which most of the sulphur is removed at 710°–1050° C before chlorination. U.S. Pat. No. 1,943,332 (Jan. 16, 1934) describes a "Method of Chloridizing Ores by means of Ferric Chloride" where, again, most of the sulphur is removed before the chloride is added. U.S. Pat. No. 3,661,564 (May 9, 1972) describes the "Extraction of Cobalt and Nickel from Laterite" which involves an oxidized ore.

In none of these is iron chloride used as an activating agent to promote the low temperature oxidation of a sulphide ore concentrate to water-insoluble iron oxide, while converting nickel, copper, cobalt and zinc to a water-soluble form, below 400° C.

SUMMARY OF THE INVENTION

In the present invention, sulphide concentrates are activated with iron chloride, so that oxidation will proceed below 400° C in the presence of an oxygen-containing gas, the iron chlorides and sulphides being converted to iron oxide, and the sulphur principally to sulphur dioxide. Non-ferrous metals such as nickel, copper, cobalt, zinc and lead are converted to chlorides and sulphates, which may be leached away from the iron oxide residue. If the concentrate is susceptible to attack by aqueous hydrochloric acid with the production of hydrogen sulphide, this is a preferred method for production of the initial iron chloride, as the hydrogen sulphide generated may be combined with the sulphur dioxide subsequently produced, to form elemental sulphur by a Claus reaction. The hydrogen chloride or chlorine gas produced during oxidation of the concentrate is absorbed and recycled. The process does not require either the high temperatures and slag production of conventional pyrometallurgy, or the expensive reagents and pressures of many hydrometallurgical processes, in order to oxidize sulphides and separate iron from the non-ferrous metals.

BRIEF DESCRIPTION OF THE DRAWING

In a drawing which illustrates embodiments of the invention.

DESCRIPTION OF THE PREFERRED EMBODIMENTS

Figure 1:
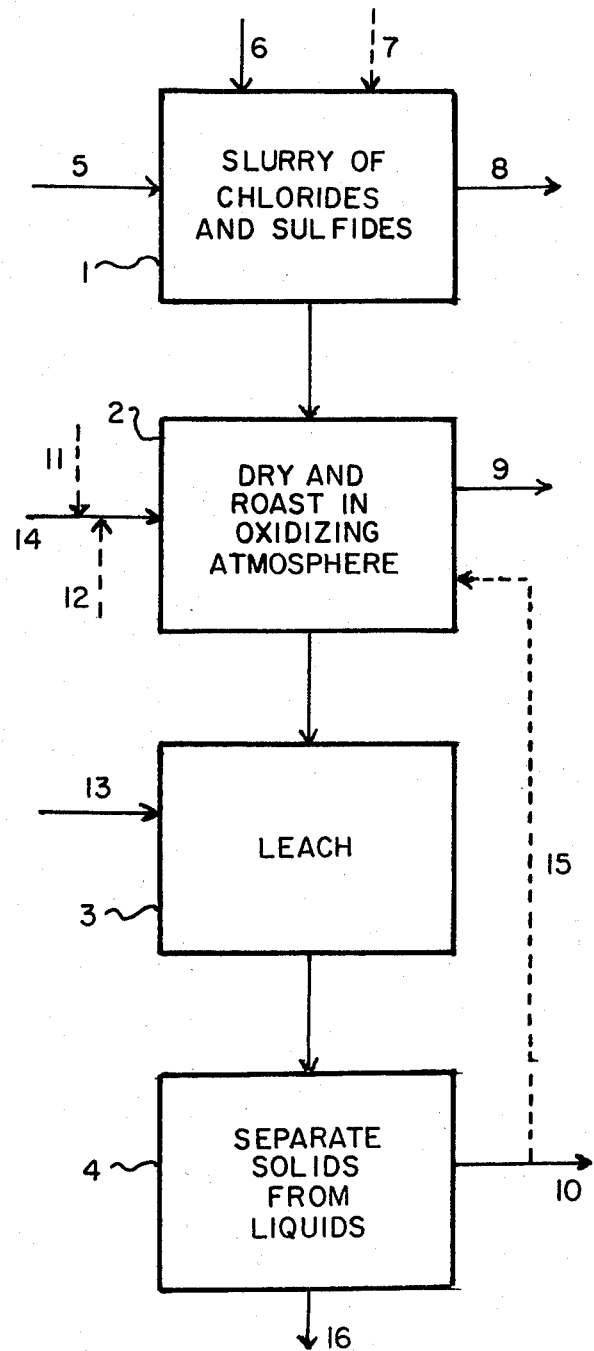
FIG. 1 is a flowsheet of the process.

Considering first a sulphide concentrate with a large proportion of pyrrhotite or other iron sulphide which is readily attacked by hydrochloric acid with generation of gaseous hydrogen sulphide, and a smaller proportion of nickel and copper minerals which may be relatively resistant to attack by hydrochloric acid, such as pentlandite and chalcopyrite, and referring to the flowsheet, FIG. 1:

A solution of hydrochloric acid 6 is mixed with the sulphide concentrate 5 in a container 1, hydrogen sulphide being given off at 8. Preferably the hydrochloric acid should be concentrated, and during the reaction may be reinforced by hydrogen chloride gas to decrease the amount of water evaporation in the next step. It has been found that if the initial paste or slurry is unheated, the reaction proceeds without the formation of the large amounts of stable foam which are a characteristic feature of a heated slurry. After the initial reaction decreases in violence, the slurry may be heated to complete the reaction and drive off about two-thirds of the sulphur content of the concentrate as hydrogen sulphide, so that it may be combined with sulphur dioxide produced in a subsequent step, in a Claus reaction, with non-polluting elemental sulphur as the final product:

$$2 H_2S + SO_2 = 2 H_2O = 3 S$$

When dealing with a concentrate largely composed of more acid-resistant sulphides such as chalcopyrite, pentlandite or pyrite, instead of acid to form iron chloride in place, a solution of iron chloride may be added as shown by a dotted line at 7, FIG. 1. In this case, of course, little or no hydrogen sulphide will be evolved.

It is obviously desirable to have enough chloride, as iron chloride, present to unite stoichiometrically with the nickel, copper, cobalt, zinc and minor amounts of other non-ferrous metals such as platinum and rhodium which are rendered water-soluble during the roasting phase. A deficiency of chloride may be tolerated as some sulphate is formed to replace it. In the case of lead sulphide, when present in considerable amount this tends to oxidize to waterinsoluble lead sulphate.

The slurry or paste in 1 is transferred to a roasting stage 2 where it is subjected to an oxygen-containing gas 14, such as air, at a temperature of 220° to 400° C, but preferably between 310° and 380° C. At 240° C the reaction proceeds satisfactorily to more than half the desired extent, but then decreases, possibly due to a coating of elemental sulphur which inhibits oxidation. As the temperature approaches 400° C, there is a tendency for the nickel, copper, zinc and cobalt in the roasted product to become waterinsoluble.

When dry material is roasted, considerable elemental sulphur and ferric chloride, together with sulphur chlorides may be vaporized, which is usually undesirable when sulphur dioxide required for a Claus reaction is utilized. To prevent this, enough $H_2O$ should be present in the slurry in a continuous process, but may also be injected separately as shown at 11. Under these circumstances, hydrogen chloride and sulphur dioxide are the principal gaseous products at 9. If sufficient excess $H_2O$ is present, the HCl is absorbed on cooling the exit gas, forming hydrochloric acid, while the $SO_2$ gas escapes and may be subsequently recovered. In the preferred form of this invention the $SO_2$ would be reacted with $H_2S$ to produce elemental sulphur, as mentioned above. Where static bed roasting has been used, during the later stages very little chloride is available for decomposition. Under these circumstances, additional hydrogen chloride, as shown at 12, FIG. 1, may be injected into the bed of roasting material. When a low non-ferrous metal, but high iron sulphide concentrate was used as the head material, the resulting agglomerates were soft and would generate dust. To increase their hardness, a portion of the non-ferrous leach liquor may be recycled 15 to the roaster, as a binding medium for the unleached agglomerates. While, theoretically, the overall chemical reactions of the process are exothermic, the amount of water to be evaporated will determine whether it is autogenous. Additional heat may be required, and normally this would be from fuel combustion gases.

The roasted material is transferred to a leaching step 3 where water 13 is added. This water should have a pH of not less than about 1.5, to discourage undesired dissolution of the iron oxide which is normally in the form of ferric oxide. The solution of nickel, copper, cobalt or zinc 10, with minor amounts of other soluble metals, is decanted and filtered at 4 from the insoluble iron oxide and gangue 16, and then treated for recovery of metals by known processes.

EXAMPLE 1

200 grams of finely-ground flotation concentrate, analyzing by weight, 4.78% nickel, 3.66% copper, 33.7% sulphur, 48.1% iron, and the balance essentially silicates, was reacted with 400 milliliters of 12 Normal hydrochloric acid, and the excess water evaporated. The material was formed into small agglomerates about 1–3 millimeters in diameter and heated at 250° C to 380° C for four hours while air was passed through. The resulting calcine was stirred in hot water, filtered, and the residue washed with water. 97.9% of the nickel, 91.9% of the copper and 7.1% of the iron dissolved. The water-insoluble residue analyzed by weight, 0.148% nickel, 0.43% copper, 61.3% iron and 0.78% sulphur.

EXAMPLE 2

A high-grade finely-ground flotation concentrate analyzing by weight, 12.62% nickel, 8.85% copper, 38.2% iron and 34.3% sulphur was moistened with a solution containing iron chloride amounting to 43% of the concentrate weight, 36% of the iron chloride being in the ferrous state and 64% in the ferric. Air was passed through the material at 220°C to 390°C for 20 hours. The resulting calcine was stirred in hot water, filtered, and the residue washed with water. 99.6% of the nickel, 98.2% of the copper and 17.5% of the iron dissolved. The water-insoluble residue analyzed by weight, 0.07% nickel, 0.21% copper, 63.25% iron and 1.12% sulphur.

EXAMPLE 3

200 grams of finely-ground flotation concentrate, analyzing by weight, 4.81% nickel, 3.90% copper, 43.9% iron and 34.3% sulphur, was reacted with 250 milliliters of 12 Normal hydrochloric acid, and the excess water evaporated. The material was formed into small agglomerates about 1–3 millimeters in diameter and a portion heated at 294° to 324° C for 7 hours, with air and steam in a 1.3:1 weight ratio, respectively, diffusing through. The resulting calcine was stirred in hot water, filtered and the residue washed with water. 81.7% of the nickel, 40.8% of the copper and 0.05% of the iron dissolved. The water-insoluble residue analyzed by weight, 1.17% nickel, 2.94% copper, 56.3% iron and 2.34% sulphur.

Example 3 demonstrates that excessive steam mixed with the oxygen-containing gas tends to decrease the extent of solubilization of nickel and copper in the calcine.

EXAMPLE 4

200 grams of finely-ground flotation concentrate, analyzing by weight, 4.81% nickel, 3.90% copper, 43.9% iron and 34.3% sulphur, was reacted with 250 milliliters of 13 Normal hydrochloric acid, and the excess water evaporated. The material was formed into small agglomerates 1–3 millimeters in diameter and a portion heated at 246° to 348° C for 7 hours with a gaseous mixture of air:$H_2O$:HCl in ratios, by weight, of about 4.1:1:0.61 respectively, diffusing into the solid material. The resulting calcine was stirred in hot water, filtered and the residue washed with water. 96.3% of the nickel, 96.0% of the copper and 2.9% of the iron dissolved. The water-insoluble residue analyzed by weight, 0.25% nickel, 0.24% copper, 60.8% iron and 0.92% sulphur.

Example 4 indicates that in a static or countercurrent bed operation, where near the end moist oxidizing gas is operating on calcine containing little residual iron chloride, addition of HCl gas improves the reaction. This should not be a problem in a fluid bed or cocurrent bed operation where HCl is being generated continuously from the iron chloride and steam to create an HCl-containing atmosphere for all the particles throughout the reaction.

It was mentioned above that initial addition before roasting of an amount of chloride equal to that required for stoichiometric combination with soluble non-ferrous constituents is desirable. However, this is not a necessary condition, as an apparent catalytic effect of iron chloride oxidizes sufficient sulphide ion to sulphate ion to compensate for a deficiency, as is shown by the following example:

EXAMPLE 5

A high-grade finely-ground sulphide concentrate analyzing by weight, 13.98% nickel, 6.44% copper, 26.7% iron and 32.2% sulphur, was moistened with a solution containing iron chloride amounting to 8.5% of the concentrate weight. The mixture was roasted in air at 220° C to 373° C for 2 hours. The resulting calcine was stirred in hot water, filtered, and the residue washed with water. 96.8% of the nickel, 98.5% of the copper and 20.3% of the iron dissolved. The resulting solution, having a pH of 1.9, contained only 51% of the chloride ion added as iron chloride, the remainder having volatilized during the roasting process. In this solution, approximately 84% of the anion, required for stoichiometric balance with the cations, was present as sulphate ion, and only 16% as chloride ion. While less than 10% of the weight of the sulphide is required as iron chloride to act as catalyst for low-temperature roasting of the sulphide, in general it is preferred to have at least sufficient chloride ion present to stoichiometrically balance the metals dissolved.

In Example 4, above, the atomic ratio of sulphur, as sulphate, to chloride in solution was approximately 1 to 5. As the sulphate is bivalent and the chloride monovalent, less than 30% of the stoichiometrically required anion was present as sulphate, and in other tests the proportion of sulphate ion in solution has been less than 8% of the total.

EXAMPLE 6

A finely-ground copper-zinc sulphide concentrate containing, by X-Ray diffraction analysis, approximately 23% sphalerite, 30% chalcopyrite, 32% pyrite, and 5% pyrrhotite; and by chemical analysis, 7.5% copper, 10.80% zinc, 31.6% iron, and 37.9% sulphur, the remainder being principally silicates, was moistened with a solution containing iron chloride amounting to about 58% of the weight of the metal sulphides in the concentrate. The material was formed into small agglomerates 1–3 millimeters in diameter and a portion heated at 310 to 350° C for 7 hours with a gaseous mixture of air:$H_2O$:HCl in ratios, by weight, of about 30.8:1:0.61 diffusing into the solid material. The resulting calcine was stirred in hot water, filtered and the residue washed with water. 99.0% of the zinc, 97.8% of the copper and 3.9% of the iron dissolved. The water-insoluble residue analyzed by weight, 0.19% copper, 0.15% zinc, 60.1% iron and 0.4% sulphur. In this bulk concentrate containing a moderate amount of zinc, a single-stage roast is adequate.

EXAMPLE 7

A finely-ground high-grade zinc sulphide concentrate analyzing by weight, 52.81% zinc, 10.48% iron and 23.4% sulphur was moistened with a solution containing iron chloride amounting to about 156% by weight of the iron and zinc sulphides in the concentrate. The material was formed into small agglomerates 1–3 millimeters in diameter and a portion heated at 317 to 352° C for 6 hours with a gaseous mixture of air: $H_2O$:HCl in ratios, by weight, of about 4.2:1:0.61. The calcine was then leached with water, but still assayed 9.67% sulphur and contained 37.1% of the original zinc. This partially-roasted and water-leached calcine was again mixed with a solution containing iron chloride amounting to about 85% of the amount of iron and zinc sulphide present in the original concentrate and roasted under similar conditions as in the first stage for another six-hour period, and releached with water. During the two water leaches, 99.5% of the zinc and 0.2% of the iron dissolved. The water-insoluble residue analyzed by weight, 0.17% zinc, 67.3% iron and 0.06% sulfur.

In this test on high-grade zinc sulphide concentrate, approximately 156% as much chloride ion was added as iron chloride as was necessary to form zinc chloride. It is believed that the two-stage roast was necessary because the melting point of zinc chloride is below 300° C, and the large amounts of the molten salt formed from the high-grade material coated the particles to an extent that reaction ceased. This was not a problem with the lower-grade bulk concentrate of Example 6.

EXAMPLE 8

A finely-ground high-grade chalcopyrite sulphide concentrate containing, by chemical analysis, 28.5% copper, 28.9% iron, 3.0% zinc, 2.45% lead and 34.6% sulphur, was moistened with a solution containing iron chloride amounting to about 53% of the weight of the metal sulphides in the concentrate. This iron chloride contained sufficient chloride ion to convert 93% of the copper to cupric chloride. The material was formed into small agglomerates 1–3 millimeters in diameter and a portion heated at 300 to 350° C for 7 hours with an atmosphere of air:$H_2O$:HCl in a weight ratio of about 17.9:1:0.61 diffusing into the solid material. The resulting calcine was stirred in hot water, filtered and the residue washed with water. 99.4% of the copper and 0.7% of the iron dissolved, as well as 98.3% of the zinc and 97.4% of the lead which were present in minor quantities. The waterinsoluble residue analyzed, by weight, 0.25% copper, 64.1% iron, 0.059% zinc, 0.13% lead and 0.78% sulphur. The deficit in chloride ion was made up by oxidation of a small amount of sulphide to soluble sulphate ion, and it is noticeable that the small amount of lead sulphate formed was soluble in the chloride solution.

EXAMPLE 9

A repetition of the procedure on the same type of material as described in Example 8, except that air only, with no $H_2O$ or HCl other than that remaining in the air-dried agglomerates, was the atmosphere diffusing into the solid, gave somewhat poorer results. 97.5% of the copper and 5.2% of the iron, as well as 97.8% of the zinc and only 0.5% of the lead were water-soluble. The water-insoluble residue analyzed by weight, 0.84% copper, 59.8% iron, 0.084% zinc, 3.35% lead and 1.7% sulphur.

EXAMPLE 10

A finely-ground lead-copper-zinc sulphide concentrate containing, by chemical analysis, 15.77% lead, 6.51% copper, 8.64% zinc, 26.26% iron and 33.3% sulphur, was moistened with a solution containing iron chloride amounting to about 66% of the weight of the metal sulphides in the concentrate. This iron chloride contained sufficient chloride ion to convert 178% of the lead, copper and zinc to bivalent chlorides. The material was formed into small agglomerates 1–3 millimeters in diameter and a portion heated at 305° to 360° C for 6 hours with a gaseous mixture of air:$H_2O$:HCl in ratios, by weight, of about 11.2:1:0.61 diffusing into the solid material. The resulting calcine was stirred in hot water, filtered and the residue washed with water. 98.8% of the copper, 99.0% of the zinc, 0.7% of the lead and 0.2% of the iron dissolved. The residue was then stirred with ammonium acetate solution in water, which is a solvent for lead sulphate but not for lead sulphide, and 96.5% of the lead dissolved, with only traces of copper, zinc and iron. The final residue analyzed, by weight, 0.41% lead, 0.083% copper, 0.092% zinc, 62.1% iron and 0.14% sulphur.

In this instance, while about 81 mol percent of the water soluble metals were present as chlorides, the remaining water-soluble anion being sulphate, the lead sulphide was converted to water-insoluble lead sulphate. Commercially, lead sulphate is commonly leached with a mixed solution of various chloride salts, but in this determination of the products of the catalyzed low-temperature roast, the more specific ammonium acetate leach solution was used.

EXAMPLE 11

This was a repetition of the procedure on the same type of material as used in Example 10, except that the heating was at 276° to 420° C for 7 hours with a gaseous mixture of air:$H_2O$:HCl in ratios by weight of about 19.3:1:0.61 diffusing into the solid material. The resulting calcine was cooled rapidly from 420° C in air, and stirred in hot water, filtered and the residue washed with water. 66.0% of the copper, 79.5% of the zinc, 0.3% of the lead, and 0.03% of the iron dissolved. However, approximately 94% of the lead was present in the residue as lead sulphate.

Apparently, the lead sulphate formed was stable at the temperature reached. However, the water-solubilities of both the copper and zinc were appreciably reduced by decomposition of their salts above 400° C.

Examples 6 to 11 demonstrate that the catalytic effect of iron chloride in lowering the roasting temperature of iron, nickel and copper sulphides, while maintaining the water solubility of the non-ferrous heavy metals, extends to zinc sulphide. It is also shown that lead sulphide is converted to lead sulphate, which may be selectively leached from the iron oxide residue. An upper temperature limit of about 400° C has been indicated, due to decreasing water solubility of the non-ferrous metals. It has been found that this temperature limit may be increased to 450° C if the resulting calcine is cooled in an atmosphere containing hydrogen chloride and steam below 400° C before discharging from the apparatus.

Cobalt sulphide was also found to be solubilized by this treatment.

EXAMPLE 12

204 grams of finely-ground flotation concentrate, analyzing by weight, 2.68% nickel, 1.63% copper, 0.12% cobalt, 48.5% iron, 30.6% sulphur and the balance essentially silicates, was reacted with 300 milliliters of 12 Normal hydrochloric acid, and the excess water evaporated. During this acidification, approximately 74.6% of the sulphur was driven off the concentrate as hydrogen sulphide, an equivalent amount of iron sulphide, in the form of pyrrhotite, being converted to ferrous chloride. The excess water was evaporated and the material was formed into small agglomerates about 1 to 3 millimeters in diameter and a portion heated at 331° to 394° C for 7 hours with a gaseous mixture of air:$H_2O$:HCl in ratios, by weight, of about 20.6:1:0.61 diffusing into the solid material. The temperature was dropped to 350° C before discharging the material from the apparatus. The calcine was stirred with hot water, filtered and washed. 95.4% of the nickel, 79.9% of the copper, 95.7% of the cobalt, and 0.5% of the iron dissolved. The water-insoluble residue analyzed by weight, 0.16% nickel, 0.40% copper, 0.005% cobalt, 57.2% iron and 0.8% sulphur.

EXAMPLE 13

A repetition of the procedure on the same type of material as described in Example 12, except that the temperature was allowed to rise to 450° C and then dropped to 250° C before the material was discharged from the apparatus, gave only slightly poorer results. 84.7% of the nickel, 81.6% of the copper, and 0.6% of the iron dissolved. The water-insoluble residue analyzed by weight, 0.60% nickel, 0.32% copper, 57.3% iron and 0.5% sulphur. It is apparent from Example 13 that by maintaining an appreciable amount of HCl-steam in the atmosphere, the temperature may be allowed to rise to at least 450° C during the roasting cycle, provided that this atmosphere is maintained while cooling below 400° C.

EXAMPLE 14

A finely-ground blast furnace matte, analyzing by weight, 11.91% nickel, 7.86% copper, 0.59% cobalt, 47.86% iron and 27.66% sulphur was reacted with sufficient concentrated hydrochloric acid to drive off 40% of the sulphur as hydrogen sulphide, and provide sufficient chloride ion to convert 147% of the amount of nickel, copper and cobalt present to bivalent metal chlorides. The material was air dried and formed into small agglomerates about 1 to 3 millimeters in diameter and heated at 300° to 376° C for 7 hours with a gaseous mixture of air:$H_2O$:HCl in ratios, by weight, of about 12.8:1:0.61 diffusing into the solid material. The calcine was stirred with hot water, filtered and washed. 98.6% of the nickel, 99.0% of the copper, 97.3% of the cobalt and 2.3% of the iron dissolved. The water-insoluble residue analyzed by weight, 0.26% nickel, 0.12% copper, 0.02% cobalt, 68.3% iron and 0.31% sulphur.

The demonstrates that, as would be expected, synthetic sulphides formed by melting concentrates react satisfactorily to the described treatment.

It has been found that the calcine from the abovedescribed invention can be given a final leach with chlorine-water, as described in U.S. Pat. No. 2,829,967 "Recovery of Platinum Group Metals from Sulphidic Raw Materials". This decreases the amount of residual non-ferrous metals such as nickel, platinum, palladium, gold and silver, without the use of an economically-significant amount of chlorine.

Iron chloride may be either ferric chloride or ferrous chloride, as either, or both, are effective in this process. When acid is added initially, the iron chloride produced is normally in the ferrous state. Where the concentrate contains a high proportion of pyrrhotite or a material, such as matte, where the iron sulphide is attacked readily by hyrdochloric acid with evolution of hydrogen sulphide, this is the preferred, although not necessary, method of production of iron chloride. With acid-resistant sulphide minerals such as pyrite, chalcopyrite, pentlandite, sphalerite and galena, the iron chloride is preferably added as a concentrated solution. Acid-resistant sulphides may, of course, be mixed with acid-susceptible sulphides, so that first hydrogen sulphide may be evolved on acid addition, and then sulphur dioxide on roasting, the two sulphur-containing gases being then combined in a Claus reaction to produce elemental sulphur. In this latter case, the acid-susceptible sulphide is, in effect, acting as a reagent.

Roasting time will depend largely on the gas to solid ratio, which must be controlled to maintain rate of combustion and adequate heat transfer within the specified temperature range, and also to restrict the loss of solid particles with the exit gases. Obviously, the procedure may be carried out by two stages, rather than one. In this case, where oxidation in the first stage is not complete, the leach liquor from the first stage tends to be lower in soluble iron, and in sulphate anion, than the leach liquor from a more completely oxidized material.

What is claimed is:

1. A process for low-temperature roasting of finely-ground sulfides of the metallic group consisting of nickel, copper, cobalt, zinc and iron, containing at least seven percent sulphur, to produce water-insoluble iron oxide and water-soluble non-ferrous salts, comprising adding iron chloride to the sulfides in an amount equal to at least ten percent of the amount of the metal sulphides to be oxidized, heating the mixed chlorides and sulfides at temperatures between 220° C and 400° C while passing an oxygen-containing gas through said mixture, and leaching the water-soluble non-ferrous metal from the water-insoluble iron oxide with water so slightly acid as to be substantially without solvent action on ferric oxide.

2. A process as described in claim 1, where the oxygen-containing gas includes at least enough water vapor to substantially satisfy the equation:

$$2\ FeCl_2 + 2\ H_2O + 2\ O_2 \rightarrow 2\ Fe_2O_3 + 4\ HCl,$$

where the $FeCl_2$ is that in excess of the amount necessary to provide chloride ion to the non-ferrous metal chlorides formed.

3. A process as described in claim 2, where the water vapor and oxygen-containing gas contain not more than three mols of HCl to each mol of water vapor, in addition to the HCl formed in the oxidizing reaction, when the oxygen-containing gas flow is countercurrent to the zone of oxidation and first sweeps over oxidized material.

4. A process for low-temperature roasting of finely-ground sulphides containing a substantial amount of iron sulphide, an appreciable amount of the iron sulphide being amenable to attack by hydrochloric acid, as well as at least one of the non-ferrous metallic group consisting of nickel, copper, cobalt and zinc, and said finely-ground sulphide containing at least seven percent sulphur, to produce water-insoluble iron oxide and water-soluble non-ferrous salts, comprising adding hydrochloric acid to the sulphides in an amount sufficient to convert enough iron sulphide to iron chloride to amount to at least ten percent of the amount of the metal sulphides to be oxidized, heating the mixed chlorides and sulphides at temperatures between 220° C and 400° C while passing an oxygen-containing gas through said mixture, and leaching the water-soluble non-ferrous metals from the water-insoluble iron oxide with water so slightly acid as to be substantially without solvent action on ferric oxide.

5. A process as described in claim 4, where the oxygen-containing gas includes at least enough water vapor to substantially satisfy the equation:

$$2\ FeCl_2 + 2\ H_2O + 2\ O_2 \rightarrow 2\ Fe_2O_3 + 4\ HCl,$$

where the $FeCl_2$ is that in excess of the amount necessary to provide chloride ion to the non-ferrous metal chlorides formed.

6. A process as described in claim 5, where the water vapor and oxygen-containing gas contain not more than three mols of HCl to each mol of water vapor, in addition to the HCl formed in the oxidizing reaction, when the oxygen-containing gas flow is countercurrent to the zone of oxidation and first sweeps over oxidized material.

7. A process for low-temperature roasting of finely-ground sulfides of the metallic group consisting of nickel, copper, cobalt, zinc and iron, containing at least seven percent sulfur, to produce water-insoluble iron oxide and water soluble non-ferrous salts, comprising adding iron chloride to the sulfides in an amount equal to at least ten percent of the amount of the metal sulfides to be oxidized, heating the mixed chlorides and sulfides at temperatures between 220° C and 450° C while passing an oxygen-containing gas through said mixture, and adding enough $H_2O$ to ensure that said oxygen-containing gas includes at least enough water vapor to substantially satisfy the equation:

$$2\ FeCl_2 + 2\ H_2O + 2\ O_2 = 2\ Fe_2O_3 + 4\ HCl,$$

where the $FeCl_2$ is that in excess of the amount necessary to provide chloride ion to the non-ferrous metal chlorides formed, and where a ratio of between three mols of HCl to each mol of water vapor, and 0.1 mol of HCl to each mol of water vapor, is maintained in the atmosphere surrounding the calcine while it is cooled below 400° C, and leaching the water-soluble non-ferrous metal from the water-insoluble iron oxide with water so slightly acid as to be substantially without solvent action on ferric oxide.

8. A process for low-temperature roasting of finely-ground sulfides containing a substantial amount of iron sulfide, an appreciable amount of the iron sulfide being amenable to attack by hydrochloric acid, as well as at least one of the non-ferrous metallic group consisting of nickel, copper, cobalt and zinc, and said finely-ground sulfide containing at least seven percent sulfur, to produce water-insoluble iron oxide and water-soluble non-ferrous salts, comprising adding hydrochloric acid to the sulfides in an amount sufficient to convert enough iron sulfide to iron chloride to amount to at least ten percent of the amount of the metal sulfides to be oxidized, heating the mixed chlorides and sulfides at temperatures between 220° C and 450° C while passing an oxygen-containing gas through said mixture, and adding enough $H_2O$ to ensure that said oxygen-containing gas includes at least enough water vapor to substantially satisfy the equation:

$$2\ FeCl_2 + 2\ H_2O + 2\ O_2 = 2\ Fe_2O_3 + 4\ HCl,$$

where the $FeCl_2$ is that in excess of the amount necessary to provide chloride ion to the non-ferrous metal chlorides formed, and where a ratio of between three mols of HCl to each mol of water vapor, and 0.1 mol of HCl to each mol of water vapor, is maintained in the atmosphere surrounding the calcine while it is cooled below 400° C, and leaching the water-soluble non-ferrous metal from the water insoluble iron oxide with water so slightly acid as to be substantially without solvent action on ferric oxide.

9. A process for low-temperature roasting of a finely-ground matte made by melting and cooling sulphides containing iron as an appreciable constituent, as well as at least one of the non-ferrous metals such as copper, nickel, cobalt and zinc in appreciable amount, and also containing at least seven percent sulphur, the iron sulphide being amenable to attack by hydrochloric acid, to produce water-insoluble iron oxide and water-soluble salts of the said non-ferrous metals, comprising adding hydrochloric acid to the sulphides in an amount sufficient to convert enough iron sulphide to iron chloride so that the iron chloride is equal to at least ten percent of the amount of the residual metal sulphides to be oxidized, heating the mixed chlorides and sulphides at a temperature of 220° C to 400° C while passing an oxygen-containing gas through said mixture, and leaching the water-soluble non-ferrous metals from the water-insoluble iron oxide with water so slightly acid as to be substantially without solvent action on ferric oxide.

10. A process as described in claim 9, where the oxygen-containing gas includes at least enough water vapor to substantially satisfy the equation:

$$2 FeCl_2 + 2 H_2O + 2 O_2 \rightarrow 2 Fe_2O_3 + 4 HCl,$$

where the $FeCl_2$ is that in excess of the amount necessary to provide chloride ion to the non-ferrous metal chlorides formed.

11. A process as described in claim 10, where the water vapor and oxygen-containing gas contain not more than three mols of HCl to each mol of water vapor, in addition to the HCl formed in the oxidizing reaction, when the oxygen-containing gas flow is countercurrent to the zone of oxidation and first sweeps over oxidized material.

* * * * *